US012139379B2

(12) United States Patent
Chen et al.

(10) Patent No.: US 12,139,379 B2
(45) Date of Patent: Nov. 12, 2024

(54) AUTOMATIC LOADING SYSTEM FOR VEHICLES

(71) Applicant: FORMOSA HEAVY INDUSTRIES CORPORATION, Kaohsiung (TW)

(72) Inventors: Jung-Hui Chen, Kaohsiung (TW); Ting-Wang Yi, Kaohsiung (TW); Yao-Yuan Shih, Kaohsiung (TW); Kai-Siang Ho, Kaohsiung (TW)

(73) Assignee: FORMOSA HEAVY INDUSTRIES CORPORATION, Kaohsiung (TW)

( * ) Notice: Subject to any disclaimer, the term of this patent is extended or adjusted under 35 U.S.C. 154(b) by 757 days.

(21) Appl. No.: 17/370,445

(22) Filed: Jul. 8, 2021

(65) Prior Publication Data

US 2022/0041412 A1 Feb. 10, 2022

(30) Foreign Application Priority Data

Aug. 5, 2020 (TW) ................................ 109126601

(51) Int. Cl.
*B66C 19/00* (2006.01)
*B65G 63/00* (2006.01)
*B65G 63/04* (2006.01)

(52) U.S. Cl.
CPC .......... *B66C 19/002* (2013.01); *B65G 63/004* (2013.01); *B65G 63/045* (2013.01)

(58) Field of Classification Search
CPC ...... B66C 19/02; B65G 63/004; B65G 63/045
See application file for complete search history.

(56) References Cited

U.S. PATENT DOCUMENTS 2,316,667 A * 4/1943 Breslav ..................... B66C 7/00 104/98
5,048,703 A * 9/1991 Tax ....................... B66C 13/063 212/319
5,515,982 A * 5/1996 Hasegawa ............. B66C 19/002 212/326

(Continued)

FOREIGN PATENT DOCUMENTS

CN 2040084 U 6/1989
CN 1745031 A 3/2006

(Continued)

*Primary Examiner* — Scott A Browne
(74) *Attorney, Agent, or Firm* — Muncy, Geissler, Olds & Lowe, P.C.

(57) ABSTRACT

An automatic loading system for vehicles includes an overhead platform, a transporting machine, and a cargo carrying mechanism. The overhead platform includes two rails. The transporting machine is disposed on the rails and configured to move on the rails along a first direction. The transporting machine includes a hoist mechanism and a fork assembly disposed on the hoist mechanism. The hoist mechanism is configured to drive the fork assembly to move along a second direction which is perpendicular to the first direction. The fork assembly includes forks disposed side by side and separately. Each fork includes at least a conveyer belt. The cargo carrying mechanism is configured to carry cargos and includes a conveyer belt platform. When the fork assembly is close to the cargo carrying mechanism, the conveyer belt and the conveyer belt platform are configured to transport the cargos to the forks from the conveyer belt platform.

9 Claims, 4 Drawing Sheets

(56) References Cited

U.S. PATENT DOCUMENTS

| | | | | |
|---|---|---|---|---|
| 5,951,226 | A * | 9/1999 | Fantuzzi | B66C 19/002 212/326 |
| 6,379,104 | B1 | 4/2002 | Domino et al. | |
| 6,530,492 | B2 * | 3/2003 | Weis | B66C 19/002 414/141.4 |
| 6,551,043 | B2 * | 4/2003 | Franzen | B65G 63/004 414/803 |
| 2014/0297023 | A1 | 10/2014 | Benjamin et al. | |

FOREIGN PATENT DOCUMENTS

| | | | | |
|---|---|---|---|---|
| CN | 103030085 | A | 4/2013 | |
| CN | 105324325 | A | 2/2016 | |
| CN | 106429483 | A | 2/2017 | |
| CN | 207844430 | U | 9/2018 | |
| CN | 110451432 | A | 11/2019 | |
| CN | 111043963 | A | 4/2020 | |
| CN | 111056275 | A | 4/2020 | |
| CN | 210236997 | U | 4/2020 | |
| CN | 111153357 | A | 5/2020 | |
| CN | 210682547 | U | 6/2020 | |
| CN | 210973091 | U | 7/2020 | |
| DE | 102010027370 | A1 | 1/2012 | |
| JP | S6286400 | U | 4/1987 | |
| TW | M579743 | U | 6/2019 | |
| WO | WO-2012010160 | A2 * | 1/2012 | B66F 9/142 |
| WO | 2012010160 | A3 | 4/2012 | |
| WO | WO-2014206418 | A1 * | 12/2014 | B65G 67/04 |

* cited by examiner

AUTOMATIC LOADING SYSTEM FOR VEHICLES

RELATED APPLICATIONS

This application claims priority to Taiwan Application Serial Number 109126601, filed Aug. 5, 2020, which is herein incorporated by reference.

BACKGROUND

Field of Invention

The embodiments of the present disclosure relate to a loading system for vehicles, and more particularly, to an automatic loading system for vehicles.

Description of Related Art

At present, automatic loading systems for vehicles have been widely used in industries that use bagged materials, such as a cement industry, a food industry, a feed industry, and a fertilizer industry. In the automatic loading system for vehicles, the bagged materials are firstly placed on a pallet, and a forklift picks up the bagged materials from the pallet and then transfers the bagged materials to a truck.

However, such an automatic loading system for vehicles needs the use of the pallets, and the material cost and the warehouse management of the pallets impose a burden on the industry. In addition, when the forklift picks up the bagged materials from the pallet, forks of the forklift may be inserted into the bagged materials due to human misoperation, resulting in the destruction of the bagged materials and the leakage of the materials. In such a situation, workers need to clean the site to continue the loading operation, such that the work schedule is delayed.

SUMMARY

Therefore, one objective of the present disclosure is to provide an automatic loading system for vehicles, which can omit the use of pallets and avoid the action of a forklift to pick up a cargo, such that it not only reduces the cost of pallets, reduces the burden of warehouse management, but also presents damage to the cargo, thereby effectively improving the efficiency of cargo loading.

According to the aforementioned objectives of the present disclosure, an automatic loading system for vehicles is provided. The automatic loading system for vehicles includes an overhead platform, a transporting machine and a cargo carrying mechanism. The overhead platform includes two rails. The transporting machine is disposed on the rails and is configured to move on the rails along a first direction. The transporting machine includes a hoist mechanism and a fork assembly. The fork assembly is disposed on the hoist mechanism. The hoist mechanism is configured to drive the fork assembly to move along a second direction, in which the second direction is perpendicular to the first direction. The fork assembly includes various forks, and the forks are arranged side by side and separately. Each of the forks includes at least one conveyer belt. The cargo carrying mechanism is configured to carry a cargo. The cargo carrying mechanism includes a conveyer belt platform. When the fork assembly is close to the cargo carrying mechanism, the conveyer belts and the conveyer belt platform are configured to transport the cargo to the forks from the conveyer belt platform.

According to one embodiment of the present disclosure, the overhead platform has a first end and a second end which are opposite to each other. Each of the first end and the second end is further set with at least one buffer. The buffers are located between the rails.

According to one embodiment of the present disclosure, the hoist mechanism includes a first mast, a second mast, a height adjustment oil cylinder, and a pulley assembly. The second mast is disposed under the first mast and is parallel to the first mast. The fork assembly is disposed on the second mast. The height adjustment oil cylinder is connected to the first mast. The pulley assembly connects the first mast and the second mast. When the height adjustment oil cylinder is actuated, the first mast moves along the second direction to drive the pulley assembly to drive the second mast and the fork assembly to move along the second direction.

According to one embodiment of the present disclosure, a number of the at least one conveyer belt of each of the forks is 2, and the conveyer belts are arranged in parallel.

According to one embodiment of the present disclosure, each of the forks has a front end, and the front end is tapered.

According to one embodiment of the present disclosure, the forks are divided into several fork sets. The fork sets can move individually along a third direction to adjust patches between the fork sets. The third direction is perpendicular to the first direction and the second direction.

According to one embodiment of the present disclosure, the transporting machine further includes a base, various rollers, a rotating shaft, an angle adjustment oil cylinder, and a shaft support mechanism. The base includes two shaft clamping parts. The rollers are disposed on the base and are configured to move on the rails. The rotating shaft is disposed in the two shaft clamping parts. The angle adjustment oil cylinder is disposed over the base. The shaft support mechanism has an upper portion and a lower portion. The upper portion is connected to the angle adjustment oil cylinder, and the lower portion is connected to the rotating shaft. The shaft support mechanism and the hoist mechanism are connected to each other. When the angle adjustment oil cylinder is actuated, the shaft support mechanism and the hoist mechanism rotate around the rotating shaft.

According to one embodiment of the present disclosure, the transporting machine further includes at least one clamping mechanism. The clamping mechanism is disposed over the fork assembly and is configured to move along the second direction to clamp the cargo.

According to one embodiment of the present disclosure, the transporting machine further includes an optical scanner and a position sensor. The optical scanner is configured to perform an optical scanning operation on a truck under the rails when the transporting machine is moving, so as to obtain a plurality of two-dimensional contour data above a load plane of the truck. The position sensor is configured to sense a location of the transporting machine when the transporting machine is moving.

According to one embodiment of the present disclosure, when the transporting machine moves to several positions along the first direction, the transporting machine uses the position sensor to obtain a position datum of each of the positions, uses the optical scanner to perform the optical scanning operation at the positions to obtain the two-dimensional contour data above the load plane of the truck corresponding to the positions, and uses the position data and the two-dimensional contour data to form a three-dimensional contour information. The two-dimensional contour data are based on the second direction and a third direction, and the third direction is perpendicular to the first direction and the second direction.

In summary, an automatic loading system for vehicles of the present disclosure uses a coordinated action of conveyer belts of forks and a conveyer belt platform of a cargo carrying mechanism to transfer a cargo from the conveyer belt platform to the forks. Therefore, the automatic loading system for vehicles of the present disclosure can eliminate pallets, and does not need to use the forks to pick up the cargo, such that the cost of pallets is saved, the burden of warehouse management is reduced, damage to the cargo is prevented, and the efficiency of cargo loading is greatly improved.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

DETAILED DESCRIPTION

Figure 1:
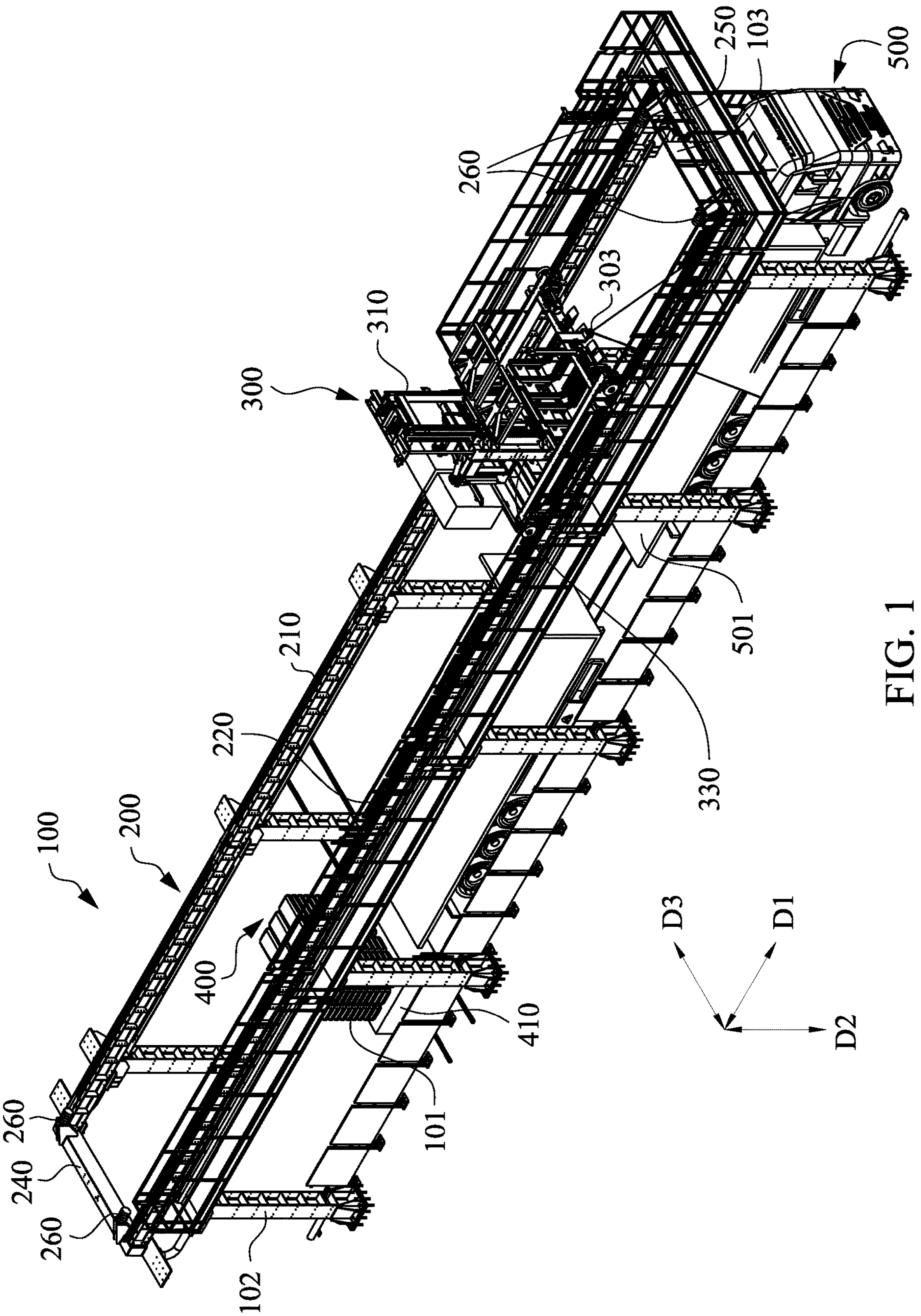
FIG. 1 is a schematic diagram of an installation of an automatic loading system for vehicles in accordance with one embodiment of the present disclosure.

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired. In addition, the terms "first", "second", and the like, as used herein, are not intended to mean a sequence or order, and are merely used to distinguish elements or operations described in the same technical terms.

Furthermore, the spatial relationship between two elements described in the present disclosure applies not only to the orientation depicted in the drawings, but also to the orientations not represented by the drawings, such as the orientation of the inversion. Moreover, the terms "connected", "coupled", "electrically connected", or the like between two components referred to in the present disclosure are not limited to the direct connection, coupling, or electrical connection of the two components, and may also include indirect connection, coupling, or electrical connection as required.

Referring to FIG. 1, FIG. 1 is a schematic diagram of an installation of an automatic loading system for vehicles in accordance with one embodiment of the present disclosure. An automatic loading system 100 for vehicles may mainly include an overhead platform 200, a transporting machine 300, and a cargo carrying mechanism 400. A truck 500 may be parked directly under the overhead platform 200, such that the automatic loading system 100 for vehicles can transfer a cargo 101 from the cargo carrying mechanism 400 to the truck 500 by using the transporting machine 300.

As shown in FIG. 1, the overhead platform 200 may include two rails 210 and 220. The two rails 210 and 220 are parallel to each other and spaced apart. Each of the rails 210 and 220 is arranged along a first direction D1. A length of the rails 210 and 220 and a spacing between the rails 210 and 220 can be adjusted according to an actual situation at the time of loading. For example, the length of the rails 210 and 220 and the spacing between the rails 210 and 220 may be adjusted according to a number and lengths of the trucks 500, a position of the cargo carrying mechanism 400, and an object configuration at a loading site. The overhead platform 200 has a first end 240 and a second end 250, which are opposite to each other. The first end 240 and the second end 250 are respectively adjacent to two ends of the rails 210 and 220.

In some examples, as shown in FIG. 1, the automatic loading system 100 for vehicles may further include various support members 102, and the support members 102 are configured to support the overhead platform 200. These support members 102 may be fixed on the ground to carry the overhead platform 200 by a supporting manner. In some other examples, when the overhead platform 200 is installed in a site with a ceiling, the support members 102 may extend downward from the ceiling to carry the overhead platform 200 by a hanging manner.

The transporting machine 300 can transport the cargo 101. The transporting machine 300 is disposed on the rails 210 and 220. The transporting machine 300 can move back and forth along the first direction D1 on the rails 210 and 220. Each of the first end 240 and the second end 250 of the overhead platform 200 may be optionally set with at least one buffer 260. As the example shown in FIG. 1, each of the first end 240 and the second end 250 are set with two buffers 260. These buffers 260 are located between the rails 210 and 220. When the transporting machine 300 moves on the rails 210 and 220 and approaches the first end 240 or the second end 250 of the overhead platform 200, the buffers 260 can prevent the transporting machine 300 from continuing to move, and provide the transporting machine 300 with a buffer force in the direction D1

Figure 2:
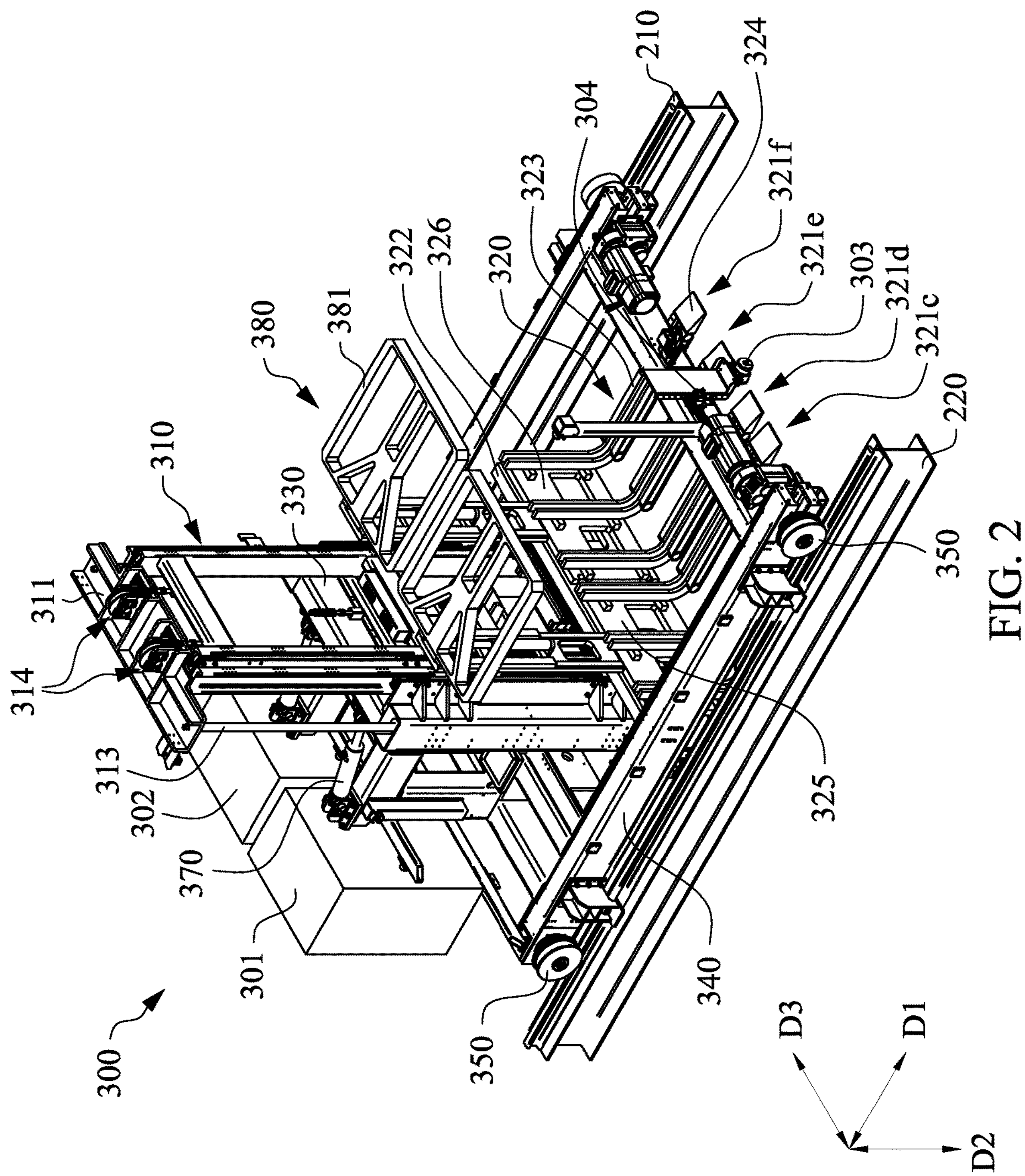
FIG. 2 is a schematic three-dimensional diagram of a transporting machine of an automatic loading system for vehicles in accordance with one embodiment of the present disclosure.
Figure 3:
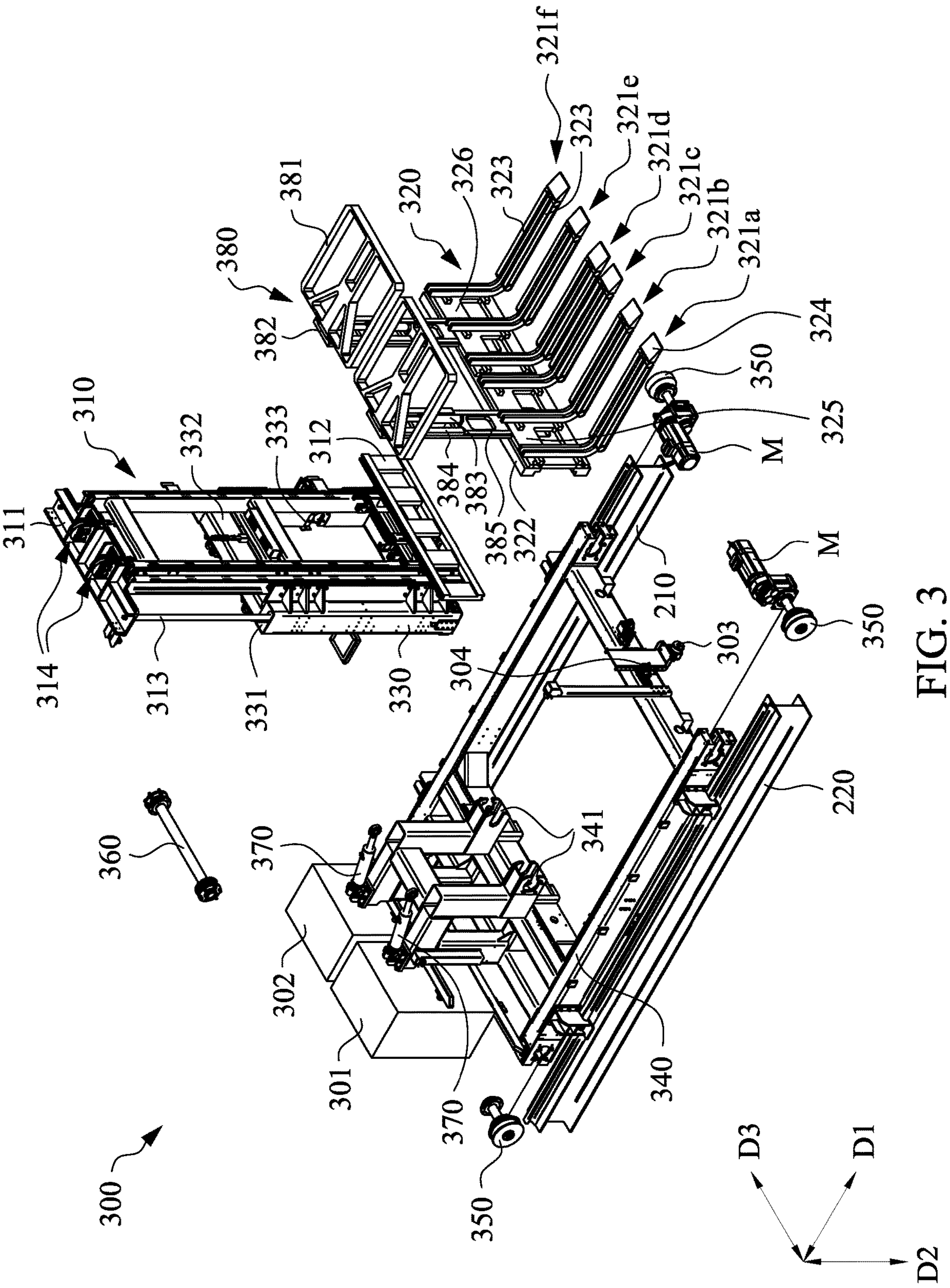
FIG. 3 is a schematic assembly drawing of a transporting machine of an automatic loading system for vehicles in accordance with one embodiment of the present disclosure.

Referring to FIG. 2 and FIG. 3 simultaneously, FIG. 2 and FIG. 3 are respectively a schematic three-dimensional diagram and a schematic assembly drawing of a transporting machine of an automatic loading system for vehicles in accordance with one embodiment of the present disclosure. The transporting machine 300 mainly includes a hoist mechanism 310 and a fork assembly 320. The fork assembly 320 may be used to support the cargo 101 shown in FIG. 1. The hoist mechanism 310 is connected with the fork assembly 320 to raise and lower the fork assembly 320. In some examples, the hoist mechanism 310 may mainly include a first mast 311, a second mast 312, a height adjustment oil cylinder 313, and a pulley assembly 314. The second mast 312 is disposed under the first mast 311 and is parallel to the first mast 311. One end of the height adjustment oil cylinder 313 is connected to the first mast 311. The pulley assembly 314 connects the first mast 311 and the second mast 312.

In some exemplary examples, the transporting machine 300 may further include a shaft support mechanism 330. The hoist mechanism 310 is disposed on the shaft support mechanism 330 and is connected to the shaft support mechanism 330. For example, as shown in FIG. 1 and FIG. 2, the hoist mechanism 310 is fixed on an inner side of the shaft support mechanism 330 and faces the second end 250 of the overhead platform 200. One end of the height adjustment oil cylinder 313 of the hoist mechanism 310 is disposed within the shaft support mechanism 330. Therefore, the two opposite ends of the height adjustment oil cylinder 313 are respectively connected to the first mast 311 and the shaft support mechanism 330. For example, the shaft support mechanism 330 may include a cavity 331, in which the height adjustment oil cylinder 313 may be inserted in the cavity 331. Such a design can make the structure formed by the hoist mechanism 310 and the shaft support mechanism 330 more compact. The hoist mechanism 310 may include two height adjustment oil cylinders 313 opposite to each other, the shaft support mechanism 330 may include two cavities 331 opposite to each other, and the two height adjustment oil cylinders 313 are respectively inserted in the two cavities 331. In other examples, the hoist mechanism 310 may only include one height adjustment oil cylinder 313, which is correspondingly inserted in one cavity 331 of the shaft support mechanism 330.

The fork assembly 320 is disposed on the hoist mechanism 310. As shown in FIG. 2 and FIG. 3, the fork assembly 320 may be disposed on the second mast 312 of the hoist mechanism 310, for example. The hoist mechanism 310 can drive the fork assembly 320 to move along a second direction D2. The second direction D2 is perpendicular to the first direction D1. That is, when the height adjustment oil cylinders 313 are actuated to contract or extend, the height adjustment oil cylinders 313 will drive the first mast 311 to move along the second direction D2, and the movement of the first mast 311 will drive the pulley assembly 314 to drive the second mast 311 and the fork assembly 320 thereon to move along the second direction D2. For example, when the height adjustment oil cylinders 313 contract, the first mast 311 moves downward along the second direction D2 to drive the pulley assembly 314, and the pulley assembly 314 further drives the second mast 311 and the fork assembly 320 to move downward along the second direction D2.

In some examples, as shown in FIG. 3, the transporting machine 300 may further include a base 340, several rollers 350, a rotating shaft 360, and an angle adjustment oil cylinder 370. The base 340 is a carrying platform of the transporting machine 300 to carry other components. For example, the base 340 may include two shaft clamping parts 341. The two shaft clamping parts 341 may be arranged at the same height, and are arranged with an interval along a third direction D3. The third direction D3 is perpendicular to the first direction D1 and the second direction D2.

The rollers 350 are disposed on the base 340. The rollers 350 may move on the rails 210 and 220. In some examples, the transporting machine 300 includes four rollers 350, in which two of the rollers 350 are arranged on a front side of the base 340, and the other two of the rollers 350 are arranged on a rear side of the base 340. In some exemplary examples, the two rollers 350 arranged on the front side of the base 340 are respectively connected to two motors M. The two motors M can respectively drive the two rollers 350 on the front side of the base 340 to roll, so as to further drive the two rollers 350 on the rear side of the base 340.

The rotating shaft 360 passes through the two shaft clamping parts 341 of the base 340. For example, two opposite end portions of the rotating shaft 360 respectively pass through the two shaft clamping parts 341, such that the shaft clamping parts 341 can clamp the rotating shaft 360. The two end portions of the rotating shaft 360 are further respectively connected to two opposite sides of the shaft support mechanism 330.

The angle adjustment oil cylinder 370 is disposed over the base 340. As the example shown in FIG. 2 and FIG. 3, the transporting machine 300 may include two angle adjustment oil cylinders 370. The two angle adjustment oil cylinders 370 are arranged with an interval along the third direction D3. Two ends of each of the angle adjustment oil cylinders 370 are respectively connected to the base 340 and the shaft support mechanism 330. The shaft support mechanism 330 may have an upper portion 332 and a lower portion 333, in which the upper portion 332 is located above the lower portion 333. In some examples, the upper portion 332 is connected to the angle adjustment oil cylinders 370, and the lower portion is connected to the rotating shaft 360.

The shaft support mechanism 330 is connected to the hoist mechanism 310, and the shaft support mechanism 330 is connected with the rotating shaft 360 and the angle adjustment oil cylinders 370, such that the actuation of the angle adjustment oil cylinders 370 can drive the shaft support mechanism 330 and the hoist mechanism 310 to rotate around the rotating shaft 360. For example, referring to FIG. 2, when the angle adjustment oil cylinders 370 are contracted, the shaft support mechanism 330 and the hoist mechanism 310 can be driven to rotate around the rotating shaft 360 in a counterclockwise direction, such that the fork assembly 320 on the hoist mechanism 310 can be raised by an angle in the counterclockwise direction. When the angle adjustment oil cylinders 370 extend, the fork assembly 320 can be driven to tilt in a clockwise direction.

In application, when the fork assembly 320 is loaded with the cargo 101 as shown in FIG. 1, the angle adjustment oil cylinders 370 can be retracted to raise the fork assembly 320 by an angle in the counterclockwise direction, such that the fork assembly 320 can hold the cargo 101 more stably. When the cargo 101 is unloaded from the fork assembly 320, the angle adjustment oil cylinders 370 can be extended to make the fork assembly 320 tilt forward in the clockwise direction, such that the cargo 101 can be unloaded from the fork assembly 320 more smoothly.

In some examples, the transporting machine 300 further optionally includes at least one clamping mechanism 380. For example, the transporting machine 300 may include two clamping mechanisms 380. The clamping mechanisms 380 may be disposed over the fork assembly 320. The clamping mechanisms 380 are configured to move along the second direction D2, such that it can work with the fork assembly 320 to clamp the cargo 101 as shown in FIG. 1. In some exemplary examples, as shown in FIG. 3, each of the clamping mechanisms 380 may include a pressing member 381, a supporting member 382, and an oil cylinder 383. The pressing member 381 may be used to press the cargo 101 on the fork assembly 320. The supporting member 382 is connected to the fork assembly 320. Two ends of the oil cylinder 383 are respectively connected to the pressing member 381 and the supporting member 382. When the oil cylinder 383 is contracted, the pressing member 381 can be driven to move downward along the second direction D2 to press the cargo 101. When the oil cylinder 383 is extended, the pressing member 381 can be driven to move upward along the second direction D2 to release the cargo 101.

The clamping mechanism 380 may further optionally include a sliding member 384. The sliding member 384 is connected to the pressing member 381. In such an example, the supporting member 382 has a guide channel 385, and the sliding member 384 is disposed in the guide channel 385. When the oil cylinder 383 is activated, the sliding member 384 can slide in the guide channel 385, such that the pressing member 381 can move up and down more stably and smoothly.

The transporting machine 300 may further optionally include an optical scanner 303 and a position sensor 304 according to practical application requirements. As shown in FIG. 2 and FIG. 3, the optical scanner 303 and the position sensor 304 may be disposed on the base 340. Also referring to FIG. 1, the optical scanner 303 is configured to perform an optical scanning operation on the truck 500 under the rails 210 and 220 of the overhead platform 200 when the transporting machine 300 moves to several positions, to obtain two-dimensional contour data above a load plane 501 of the truck 500 corresponding to these positions respectively. The position sensor 304 is configured to sense a location of the transporting machine 300 when the transporting machine 300 moves on the rails 210 and 220, to obtain corresponding position data respectively. For example, the position sensor 304 may be an infrared transceiver.

In some examples, the transporting machine 300 may further include an electrical box 301 and an oil system box 302. The electrical box 301 is disposed on the base 340 and can control an electrical system of the transporting machine 300. The oil system box 302 is also disposed on the base 340 and can control an oil system of the transporting machine 300. The electrical box 301 and the oil system box 302, as well as the hoist mechanism 310 and the fork assembly 320 may be respectively arranged on two opposite sides of the rotating shaft 360, so as to maintain the balance of the center of gravity of the transporting machine 300.

In some examples, as shown in FIG. 3, the fork assembly 320 may include forks 321*a*-321*f*. The forks 321*a*-321*f* are arranged side by side and spaced along the third direction D3. For example, each of the forks 321*a*-321*f* may be L-shaped. The forks 321*a*-321*f* may be directly disposed on the second mast 312. Alternatively, the fork assembly 320 may optionally include a carrying plate 322. The carrying plate 322 is joined to the second mast 312, and the forks 321*a*-321*f* are joined to the carrying plate 322. The carrying plate 322 can move along the third direction D3. When the parking position of the truck 500 is offset, the carrying plate 322 can move along the third direction D3 to drive the forks 321*a*-321*f*, so that the forks 321*a*-321*f* can correspond to the loading position of the truck 500.

In some exemplary examples, the fork assembly 320 may further include connection plates 325 and 326, in which the connection plates 325 and 326 are disposed on one side of the carrying plate 322. The carrying plate 322 can move along the third direction D3 to drive the connection plates 325 and 326. In addition, the forks 321*a*-321*f* may be divided into several fork sets, and each of the fork sets includes various forks. For example, the forks 321*a*-321*c* are one set, and the forks 321*d*-321*f* are another set. One set of forks 321*a*-321*c* may be disposed on the connection plate 325, and the other set of forks 321*d*-321*f* may be disposed on the connection plate 326. The connection plates 325 and 326 may be individually moved on the carrying plate 322 along the third direction D3, such that the forks 321*a*-321*c* and the forks 321*d*-321*f* on them are respectively driven to move along the third direction D3, so as to adjust the spacing between two adjacent fork sets. Referring to FIG. 1, when the cargos 101 are put on the cargo carrying mechanism 400 and two adjacent cargos 101 may not be close together, the spacing between the two adjacent fork sets can be adjusted, such that each of the fork sets can more accurately correspond to the positions of the cargos 101 on the cargo carrying mechanism 400.

In addition, the spacing between two adjacent forks of each of the fork sets may be set according to actual needs. For example, in the combination of forks 321*a*-321*c*, the spacing between the forks 321*b* and 321*a*, and the spacing between the forks 321*b* and 321*c* may be set according to the arrangement of the cargos 101 on the cargo carrying mechanism 400 as shown in FIG. 1, such that the cargos 101 are transferred from the cargo carrying mechanism 400 to the forks 321*a*-321*f* more stably.

As shown in FIG. 3, each of the forks 321*a*-321*f* includes at least one conveyer belt 323. In some examples, each of the forks 321*a*-321*f* may include two conveyer belts 323, and in each of the forks 321-321*f*, these conveyer belts 323 are arranged in parallel. Each of the forks 321-321*f* has a front end 324. In some exemplary examples, the front end 324 is tapered. Also referring to FIG. 1, when the cargo 101 is unloaded from the forks 321*a*-321*f* onto the load plane 501 of the truck 500, the tapered front ends 324 can reduce a height difference between the cargo 101 on the forks 321*a*-321*f* and the load plane 501, and the cargo 101 can be unloaded more smoothly.

Figure 4:
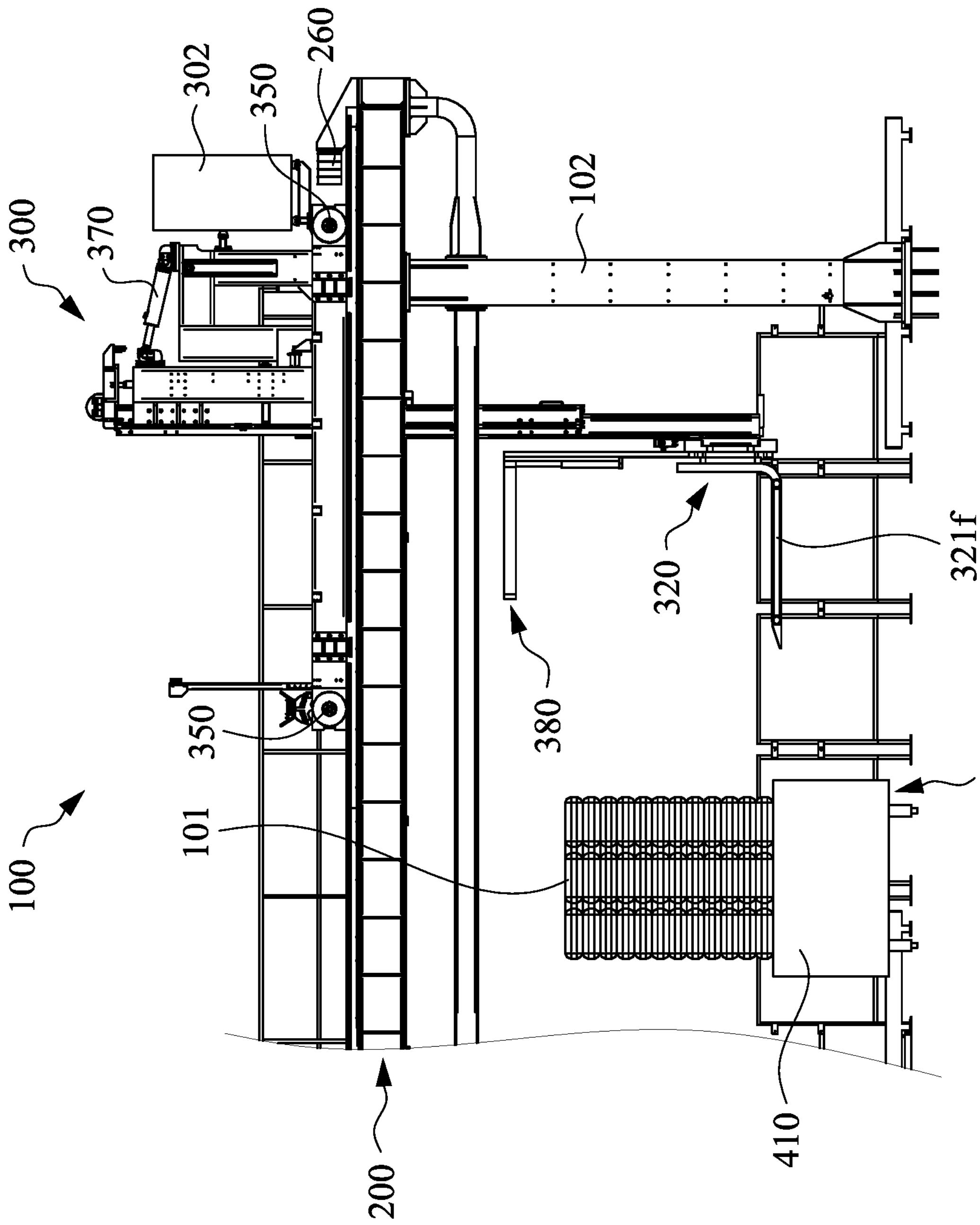
FIG. 4 is a schematic diagram showing a fork assembly of a transporting machine of an automatic loading system for vehicles descending and approaching a cargo carrying mechanism in accordance with one embodiment of the present disclosure.

Referring to FIG. 3 and FIG. 4 simultaneously, FIG. 4 is a schematic diagram showing a fork assembly of a transporting machine of an automatic loading system for vehicles descending and approaching a cargo carrying mechanism in accordance with one embodiment of the present disclosure. The cargo carrying mechanism is configured to carry the cargo 101. The cargo carrying mechanism 400 includes a conveyer belt platform 410. The cargo 101 is placed on the conveyer belt platform 410. When the cargo 101 on the cargo carrying mechanism 400 is loading onto the truck 500, the transporting machine 300 may be moved on the rails 210 and 220 along the first direction D1 to a position above one side of the cargo carrying mechanism 400. Then, the hoist mechanism 310 is used to lower the fork assembly 320, such that the fork assembly 320 is adjacent to the cargo carrying mechanism 400. At this time, the conveyer belts 323 of the fork assembly 320 and the conveyer belt platform 410 may operate simultaneously to transfer the cargo 101 from the conveyer belt platform 410 to the forks 321*a*-321*f*.

When the fork assembly 320 is adjacent to the cargo carrying mechanism 400, upper surfaces of the conveyer belts 323 of the forks 321*a*-321*f* of the fork assembly 320 may be at the same height as an upper surface of the conveyer belt platform 410, or the upper surfaces of the conveyer belts 323 are slightly lower than the upper surface of the conveyer belt platform 410. Accordingly, when the conveyer belts 323 of the forks 321*a*-321*f* and the conveyer belt platform 410 of the cargo carrying mechanism 400 move in the same circular direction, such as a clockwise direction, the cargo 101 can be smoothly transferred from the conveyer belt platform 410 to the forks 321*a*-321*f*.

Refer to FIG. 1 and FIG. 3 again, after the cargo 101 has been transferred from the conveyer belt platform 410 to the forks 321*a*-321*f*, the clamping mechanism 380 may be firstly used to press the cargo 101 on the fork assembly 320, for example, so as to firmly clamp the cargo 101 during the transportation process. Then, transporting machine 300 is moved on the rails 210 and 220 along the first direction D1 to a suitable position above the load plane 501 of the truck 500. Next, the hoist mechanism 310 is used to lower the fork assembly 320 on the load plane 501 of the truck 500, and the conveyer belts 323 of the forks 321*a*-321*f* of the fork assembly 320 are activated to transfer the cargo 101 on the fork assembly 320 to the load plane 501 on the truck 500.

The process of transporting the cargo 101 to the truck 500 by the transporting machine 300 may be carried out in an automatic control manner. In some examples, when the transporting machine 300 moves on the overhead platform 200 along the first direction D1 to various positions, the transporting machine 300 may use the position sensor 304 to obtain the position datum of each of the positions. At the same time, the transporting machine 300 may use the optical scanner 303 to perform the optical scanning operation at these positions to obtain several two-dimensional contour data above the loading plane 501 of the truck 500 corresponding to these positions.

In some examples, the position sensor 304 is an infrared transceiver, and the second end 250 of the overhead platform 200 is set with a light reflecting plate 103. A light beam emitted by the infrared transceiver is reflected back to the infrared transceiver by the light reflecting plate 103, and is received by the infrared transceiver, such that position data can be obtained. The position sensor 304 may be implemented in other methods. For example, the position sensor 304 may be a barcode sensor, and the position data can be obtained by sensing barcodes with position information set on the overhead platform 200.

Each of the two-dimensional contour data is based on the plane contour information in the second direction D2 and the third direction D3, and corresponds to one position datum, such that the position data in the first direction D1 and the corresponding two-dimensional contour data can be used to form three-dimensional contour information. After obtaining the three-dimensional contour information above the loading plane 501 of the truck 500, a controller may be used to control the moving distance of the transporting machine 300 in the first direction D1, and the moving distances of the fork assembly 320 in the second direction D2 and the third direction D3 according to the cargo information and the three-dimensional contour information input by a user. Thus, the transporting machine 300 can reach the appropriate loading and unloading positions, the fork assembly 320 can be lowered to the appropriate picking and unloading positions, and then the cargo 101 can be unloaded on the load plane 501 of the truck 500.

According to the aforementioned embodiments, one advantage of the present disclosure is that an automatic loading system for vehicles of the present disclosure uses a coordinated action of conveyer belts of forks and a conveyer belt platform of a cargo carrying mechanism to transfer a cargo from the conveyer belt platform to the forks. Therefore, the automatic loading system for vehicles of the present disclosure can eliminate pallets, and does not need to use the forks to pick up the cargo, such that the cost of pallets is saved, the burden of warehouse management is reduced, damage to the cargo is prevented, and the efficiency of cargo loading is greatly improved.

According to the aforementioned embodiments, another advantage of the present disclosure is that an automatic loading system for vehicles of the present disclosure can construct the three-dimensional contour information above a loading plane of a truck through a position sensor and an optical scanner of a transporting machine, and a controller can use the three-dimensional contour information to achieve the function of automatic loading and unloading.

The features of several embodiments are outlined above, so those skilled in the art can understand the aspects of the present disclosure. Those skilled in the art will appreciate that the present disclosure can be readily utilized as a basis for designing or modifying other processes and structures, thereby achieving the same objectives and/or achieving the same advantages as the embodiments described herein. Those skilled in the art should also understand that these equivalent constructions do not depart from the spirit and scope of the present disclosure, and they can make various changes, substitutions, and alteration without departing from the spirit and scope of the present disclosure.

What is claimed is:

1. An automatic loading system for vehicles, comprising:
- an overhead platform comprising two rails;
- a transporting machine disposed on the rails and configured to move on the rails along a first direction, wherein the transporting machine comprises:
  - a hoist mechanism;
  - a fork assembly disposed on the hoist mechanism, wherein the hoist mechanism is configured to drive the fork assembly to move along a second direction which is perpendicular to the first direction, the fork assembly comprises a plurality of forks which are disposed side by side and separately, and each of the forks comprises at least one conveyer belt;
  - an optical scanner configured to perform an optical scanning operation on a truck under the rails when the transporting machine is moving, so as to obtain a plurality of two-dimensional contour data above a load plane of the truck; and
  - a position sensor configured to sense a location of the transporting machine when the transporting machine is moving; and
- a cargo carrying mechanism configured to carry a cargo, wherein the cargo carrying mechanism comprises a conveyer belt platform,
- wherein when the fork assembly is close to the cargo carrying mechanism, the conveyer belts and the conveyer belt platform are configured to transport the cargo to the forks from the conveyer belt platform.

2. The automatic loading system for vehicles of claim 1, wherein the overhead platform has a first end and a second end which are opposite to each other, each of the first end and the second end is further set with at least one buffer, and the buffers are located between the rails.

3. The automatic loading system for vehicles of claim 1, wherein the hoist mechanism comprises:
- a first mast;
- a second mast disposed under the first mast and parallel to the first mast, wherein the fork assembly is disposed on the second mast;
- a height adjustment oil cylinder connected to the first mast; and
- a pulley assembly connecting the first mast and the second mast;
- wherein when the height adjustment oil cylinder is actuated, the first mast moves along the second direction to drive the pulley assembly to drive the second mast and the fork assembly to move along the second direction.

4. The automatic loading system for vehicles of claim 1, wherein a number of the at least one conveyer belt of each of the forks is 2, and the conveyer belts are arranged in parallel.

5. The automatic loading system for vehicles of claim 1, wherein each of the forks has a front end, and the front end is tapered.

6. The automatic loading system for vehicles of claim 1, wherein the forks are divided into a plurality of fork sets, the fork sets can move individually along a third direction to adjust patches between the fork sets, the fork sets can also move together along the third direction, and the third direction is perpendicular to the first direction and the second direction.

7. The automatic loading system for vehicles of claim 1, wherein the transporting machine further comprises:

a base comprising two shaft clamping parts;

a plurality of rollers disposed on the base and configured to move on the rails;

a rotating shaft disposed in the two shaft clamping parts;

an angle adjustment oil cylinder disposed over the base; and a shaft support mechanism having an upper portion and a lower portion, wherein the upper portion is connected to the angle adjustment oil cylinder, and the lower portion is connected to the rotating shaft, wherein the shaft support mechanism and the hoist mechanism are connected to each other, and when the angle adjustment oil cylinder is actuated, the shaft support mechanism and the hoist mechanism rotate around the rotating shaft.

8. The automatic loading system for vehicles of claim 1, wherein the transporting machine further comprises:

at least one clamping mechanism disposed over the fork assembly and configured to move along the second direction to clamp the cargo.

9. The automatic loading system for vehicles of claim 1, wherein when the transporting machine moves to a plurality of positions along the first direction, the transporting machine uses the position sensor to obtain a position datum of each of the positions, uses the optical scanner to perform the optical scanning operation at the positions to obtain the two-dimensional contour data above the load plane of the truck corresponding to the positions, and uses the position data and the two-dimensional contour data to form a three-dimensional contour information, wherein the two-dimensional contour data are based on the second direction and a third direction, and the third direction is perpendicular to the first direction and the second direction.

* * * * *